United States Patent
Wakabayashi

(10) Patent No.: US 9,703,392 B2
(45) Date of Patent: Jul. 11, 2017

(54) METHODS AND APPARATUS FOR RECEIVING, CONVERTING INTO TEXT, AND VERIFYING USER GESTURE INPUT FROM AN INFORMATION INPUT DEVICE

(75) Inventor: Kazuya Wakabayashi, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 471 days.

(21) Appl. No.: 13/262,053

(22) PCT Filed: Mar. 30, 2010

(86) PCT No.: PCT/JP2010/002333
§ 371 (c)(1),
(2), (4) Date: Nov. 17, 2011

(87) PCT Pub. No.: WO2010/113487
PCT Pub. Date: Oct. 7, 2010

(65) Prior Publication Data
US 2012/0174008 A1   Jul. 5, 2012

(30) Foreign Application Priority Data
Apr. 3, 2009   (JP) ................. 2009-090696

(51) Int. Cl.
G06F 3/048   (2013.01)
G06F 3/023   (2006.01)
G06F 3/0488   (2013.01)

(52) U.S. Cl.
CPC ........ *G06F 3/0237* (2013.01); *G06F 3/04883* (2013.01); *G06F 3/04886* (2013.01); *G06F 2203/04804* (2013.01)

(58) Field of Classification Search
CPC ............... G06F 3/04886; G06F 3/2037; G06F 3/04883; G06F 3/0237; G06K 9/00436
(Continued)

(56) References Cited

U.S. PATENT DOCUMENTS 5,831,615 A * 11/1998 Drews et al. ............... 715/768
5,864,636 A    1/1999 Chisaka
(Continued)

FOREIGN PATENT DOCUMENTS

EP      1475741 A1    11/2004
JP    02-096887 A     4/1990
(Continued)

OTHER PUBLICATIONS

"Translucent" and "Transparent" Collins English Dictionary. N. p.: Collins, 2000. Credo Reference. May 30, 2003. Web. Apr. 9, 2014. <http://search.credoreference.com/content/entry/hcengdict/translucent/0> and . . . transparent/0>.*
(Continued)

*Primary Examiner* — Doon Chow
*Assistant Examiner* — Wendy Nicholas
(74) *Attorney, Agent, or Firm* — Matthew B. Dernier, Esq.

(57) ABSTRACT

An information input device includes: a display unit configured to display a user interface for acknowledging user input information in a content including an input field displayed on a display, by accepting an operation on the display, the user interface being displayed transparently as superimposed in front of the content; and a transcription unit configured to provide, in the input field in the content, the user input information acknowledged in the user interface.

12 Claims, 17 Drawing Sheets

(58) Field of Classification Search
USPC .......................................................... 715/768
See application file for complete search history.

(56) References Cited

U.S. PATENT DOCUMENTS

| | | | | |
|---|---|---|---|---|
| 6,483,526 | B1* | 11/2002 | Merrick ........................ | 715/780 |
| 7,903,093 | B2* | 3/2011 | Kim et al. .................... | 345/173 |
| 8,448,082 | B2 | 5/2013 | Yoon | |
| 2003/0001899 | A1* | 1/2003 | Partanen et al. ............. | 345/800 |
| 2003/0071850 | A1* | 4/2003 | Geidl ............................ | 345/781 |
| 2004/0223647 | A1* | 11/2004 | Blount et al. ................. | 382/189 |
| 2005/0022130 | A1* | 1/2005 | Fabritius ....................... | 715/739 |
| 2007/0089066 | A1* | 4/2007 | Chaudhri et al. ............. | 715/768 |
| 2008/0174564 | A1* | 7/2008 | Kim et al. .................... | 345/173 |
| 2008/0178098 | A1* | 7/2008 | Yoon et al. ................... | 715/762 |
| 2009/0160785 | A1* | 6/2009 | Chen et al. ................... | 345/173 |
| 2009/0161958 | A1* | 6/2009 | Markiewicz et al. ........ | 382/186 |
| 2009/0207143 | A1* | 8/2009 | Yuan et al. ................... | 345/173 |
| 2009/0226091 | A1* | 9/2009 | Goldsmith ......... | G06K 9/00436 382/189 |

FOREIGN PATENT DOCUMENTS

| | | | | |
|---|---|---|---|---|
| JP | 07-168914 | A | | 7/1995 |
| JP | 11202997 | A | | 7/1999 |
| JP | 2002208994 | | * | 7/2002 ............... G06F 3/00 |
| JP | 2002208994 | A | | 7/2002 |
| JP | 2005258882 | A | * | 9/2005 ............... G06F 3/00 |
| JP | 2009-053919 | A | | 3/2009 |
| KR | 2008-0078291 | A | | 8/2008 |
| KR | WO 2008105574 | A1 | * | 9/2008 ......... G06F 3/04883 |
| WO | 2007045938 | A1 | | 4/2007 |
| WO | 2008105574 | A1 | | 9/2008 |
| WO | WO 2008105574 | A1 | * | 9/2008 ............. G06F 3/048 |

OTHER PUBLICATIONS

International Search Report for corresponding PCT Application No. PCT/JP2010/002333, dated Jun. 15, 2010.
International Preliminary Report on Patentability and Written Opinion for corresponding PCT Application No. PCT/JP2010/002333, dated Nov. 15, 2011.
Office Action issued for corresponding Chinese Patent Application No. 201080014514.2., dated Feb. 4, 2013.
Office Action issued for corresponding Japanese Patent Application No. 2009-090696, dated Mar. 26, 2013.
Office Action issued for corresponding Korean Patent Application No. 10-2011-7026115, dated May 13, 2013.
Office Action issued for corresponding Chinese Patent Application No. 201080014514.2, dated Dec. 23, 2013.
European Search Report for corresponding EP Application No. 10758267.8-1972, dated Jun. 26, 2015.

* cited by examiner

METHODS AND APPARATUS FOR RECEIVING, CONVERTING INTO TEXT, AND VERIFYING USER GESTURE INPUT FROM AN INFORMATION INPUT DEVICE

TECHNICAL FIELD

The present invention relates to data processing technology and, more particularly, to a technology of allowing a user to enter data in an information processing device such as a game device.

BACKGROUND ART

Recently, information terminals are available with reduced size and weight. Mobile information terminals such as game devices are widely used. In a mobile information terminal, content such as web pages or e-mail software is generally displayed on the display of the terminal.

Some content displayed in a mobile information terminal (e.g., a web page of a search site) include an input field where the user should enter information. Since the screen of a mobile information terminal is generally small, the user may find it inconvenient to enter information in an input field.

SUMMARY OF THE INVENTION

The present invention addresses the background and a purpose thereof is to provide a technology of improving user convenience in entering information in a content displayed in an information processing device.

An information input device comprising: a display unit configured to display a user interface for acknowledging input information from a user in a content including an input field displayed on a screen, by accepting an operation in the screen, the user interface being displayed transparently superimposed in front of the content; and a transcription unit configured to provide, in the input field in the content, the input information acknowledged in the user interface.

Another embodiment of the present invention relates to an information input method. An information input method comprising: displaying a user interface for acknowledging input information from a user in a content including an input field displayed on a screen, by accepting an operation in the screen, the user interface being displayed transparently superimposed in front of the content; and setting up, in the input field in the content, the input information acknowledged in the user interface.

Optional combinations of the aforementioned constituting elements and implementations of the invention in the form of apparatuses, methods, systems, programs, or recording mediums storing the programs may also be practiced as additional modes of the present invention.

According to the present invention, user convenience experienced when entering information in a content displayed in an information processing device is improved.

DETAILED DESCRIPTION OF THE INVENTION

A summary of the present invention will be given before describing the invention in specific detail. Typically, the following two methods are feasible as a method of allowing a user to enter a character string in an input field in a content displayed on a screen of a portable information terminal.

The first method is a method of allowing a user to enter a character string directly in an input field in a content. The second method is a method of allowing a user to use a dedicated area for temporarily acknowledging the user's input character string to enter a character string that should be entered in an input field in a content. According to the second method, the character string acknowledged in the dedicated input area is reflected in the input field in the content.

However, since the screen of a mobile information terminal is small, the user may experience inconvenience entering a character string in an input field. For example, according to the first method, the content is displayed in a small size due to the constraints imposed on the size of the screen, causing the character string entered in the input field to be displayed in a small size. Therefore, it will not only be difficult to enter a character string but also to view or correct the character string entered. According to the second method, the dedicated input area occupies part of the screen so that the display area for the content will be reduced accordingly, reducing the amount of information of the content viewable to the user.

In this embodiment, there is proposed a mobile information terminal in which the user's convenience experienced when entering a character in an input field in a content is improved. In this mobile information terminal, a user interface (hereinafter, referred to as "alternative input screen" as appropriate) designed to temporarily acknowledge input information from a user attempting to enter information in an input field in a content is displayed transparently as superimposed in front of a content. This allows a display area of a mobile information terminal with a limited screen size to be fully exploited so that the aforementioned problem is resolved. More specifically, the embodiment maintains viewability of an input character string for the user and maintains the amount of information of a content at the same time.

Figure 1:
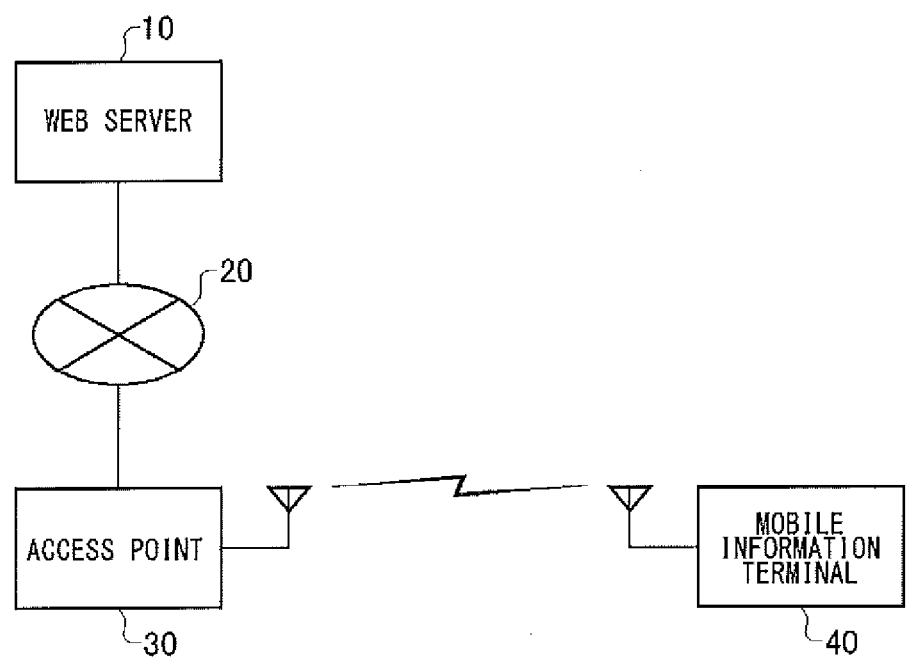
FIG. 1 shows the configuration of a communication system according to the embodiment of the present invention.

FIG. 1 shows the configuration of a communication system 100 according to the embodiment of the present invention. The communication system 1 comprises a web server 10 proving a web page of a search site, an access point 30 connected to the web server 10 via a communication network 20, and a mobile information terminal 40 connected to the access point 30 using a wireless local area network (LAN). The web server 10 provides search service. The web page of a search site provided by the web server 10 is a search request page including an input field in which a search character string should be entered by a user.

The mobile information terminal 40 is an information processing device configured to include wireless communication functions. In this embodiment, the mobile information terminal 40 is provided with wireless LAN communication functions. The mobile information terminal 40 may be provided with functions to communicated using an alternative wireless communication system. Alternatively, the mobile information terminal 40 may be provided with communication functions adapted for connection to an external device such as a router using a cable (e.g., LAN cable). The mobile information terminal 40 may be a portable game device, cell phone, or a personal digital assistant (PDA).

The access point 30 functions as a router for connecting the mobile information terminal 40 to the communication network 20 such as the Internet or a wireless LAN, i.e., functions as a wireless LAN router. The access point 30 may be a desktop game device provided with functions of a wireless LAN router.

Figure 2:
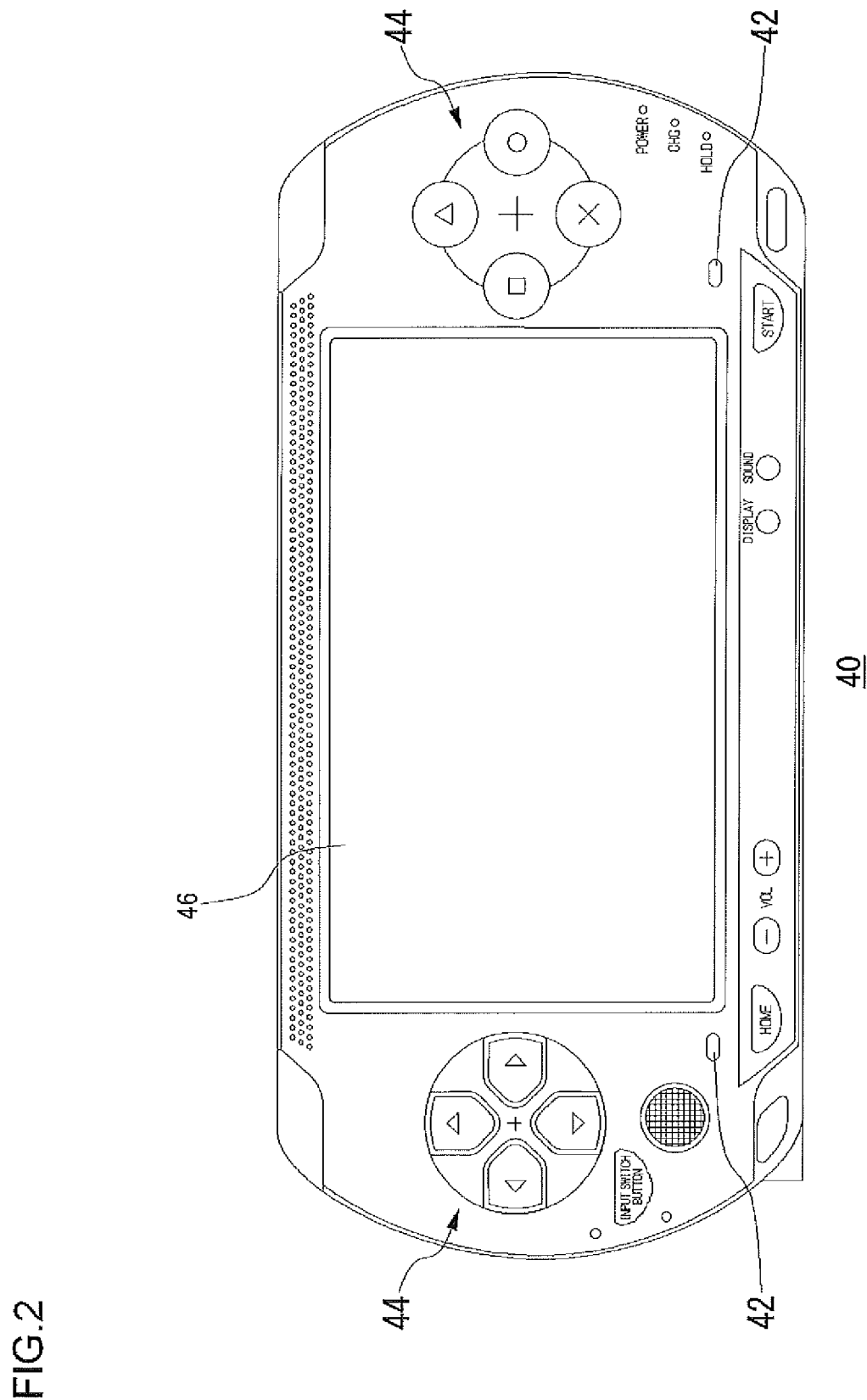
FIG. 2 shows the appearance of the mobile information terminal of FIG. 1.

FIG. 2 shows the appearance of the mobile information terminal 40 of FIG. 1. The mobile information terminal 40 comprises a display 46 displaying a game image, a graphical user interface, etc., a speaker 42 outputting audio data, and a controller 44 acknowledging a user control input.

A content such as a web page and an alternative input screen for entering data in the content are displayed on the display 46 according to the embodiment. The display 46 also functions as a touch panel and refers to a touch operation using the user's finger or a stylus pen (not shown) and communicates positional information related to a location on the display 46 touched by the user to a command acquisition unit 52 described later.

The controller 44 includes directional keys, four buttons (a circle button, a cross button, a square button, and a triangle button), a START button, a SELECT button, a HOME button, and an input switch button provided on the surface of the casing, and also includes buttons provided on the sides of the casing. The input switch button is pressed when the user selects entry of a character via an alternative input screen instead of directly entering a character in an input field in a content.

Figure 3:
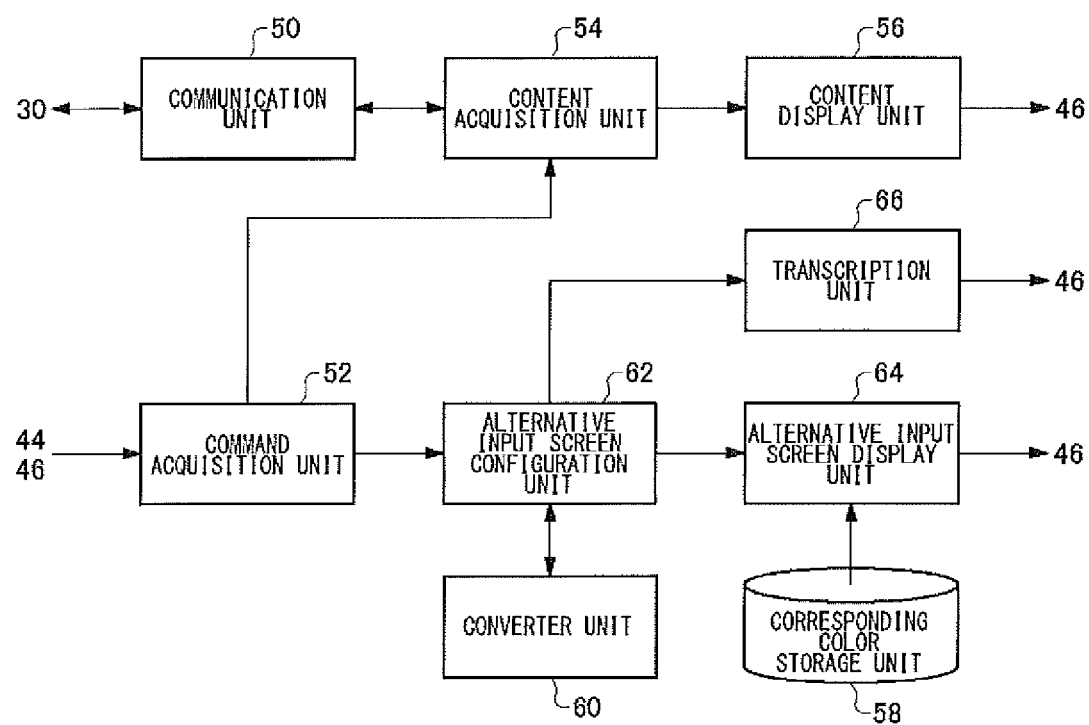
FIG. 3 is a block diagram showing the functional configuration of the mobile information terminal of FIG. 1.

FIG. 3 is a block diagram showing the functional configuration of the mobile information terminal of FIG. 1. The blocks depicted in the block diagram of this specification are implemented in hardware such as devices or mechanical components like a CPU of a computer, and in software such as a computer program etc. FIG. 3 depicts functional blocks implemented by the cooperation of these elements. Therefore, it will be obvious to those skilled in the art that the functional blocks may be implemented in a variety of manners by hardware only, software only, or a combination of thereof.

The mobile information terminal 40 comprises a communication unit 50, a command acquisition unit 52, a content acquisition unit 54, a content display unit 56, a corresponding color storage unit 58, a converter unit 60, an alternative input screen configuration unit 62, an alternative input screen display unit 64, and a transcription unit 66. The communication unit 50 transmits and receives various communication data to and from the access point 30 using the wireless LAN system.

The command acquisition unit 52 acknowledges a user command for the mobile information terminal 40 by detecting the content of a user operation using the controller 44 or the display 46. The command acquisition unit 52 communicates data indicating the user command to a functional block that should perform a process according to the command.

For example, when the command acquisition unit 52 acknowledges a command to acquire a web page, the unit communicates the command to acquire a web page to the content acquisition unit 54. When the command acquisition unit 52 detects the pressing of the input switch button, the unit 52 communicates a command to configure an alternative input screen to the alternative input screen configuration unit 62. When the command acquisition unit 52 acknowledges positional information indicating a location in the alternative input screen touched by the user, the unit 52 communicates a command to render image data for a character in the touched location (hereinafter, referred to as "character rendering command") to the alternative input screen configuration unit 62.

When the content acquisition unit 54 acknowledges a command to acquire a web page from the command acquisition unit 52, the unit 54 accesses the web server 10 via the communication unit 50 and acquires data for the web page. The content display unit 56 displays the web page acquired by the content acquisition unit 54 on the display 46.

The corresponding color storage unit 58 stores correspondence between a plurality of colors used to display a content by the content display unit 56 and their complementary colors. A complementary color is opposite to the original color in color correlation. In other words, a complementary color is a color assumed to exhibit the highest contrast against the original color.

The converter unit 60 maps an input character provided in the alternative input screen configuration unit 62 described later to a specified character (e.g., a specified alphabet or Hiragana, Japanese syllabary) (hereinafter, referred to as "specified character" as appropriate). The converter 60 may perform mapping using a publicly known character recognition technology. For example, the converter 60 may refer to a storage (not shown) that stores the stroke order or shape of a specified character so as to map an input character to a specified character by comparing the stored order or shape with the actual order or shape of the input character.

The converter 60 also converts a character string designated in a character conversion request from the alternative input screen configuration unit 62. The converter 60 may use a publicly known character conversion technology used in generally available word processor software. For example, the converter 60 acknowledges a conversion request designating an input Roman character string and converts the Roman characters into a Japanese character string, or acknowledges a conversion request designating a Hiragana character string and converts the Hiragana characters into a Kanji character string. The converter 60 communicates the result of conversion to the input screen configuration unit 62. Alternatively, upon acknowledging a conversion request, the converter 60 may communicate a plurality of conversion candidates to the alternative input screen configuration unit 62.

The alternative input screen configuration unit 62 sets up image data for an alternative input screen, sends the image data to the alternative input screen display unit 64 described later, and causes the display 46 to display the image.

Figure 4:
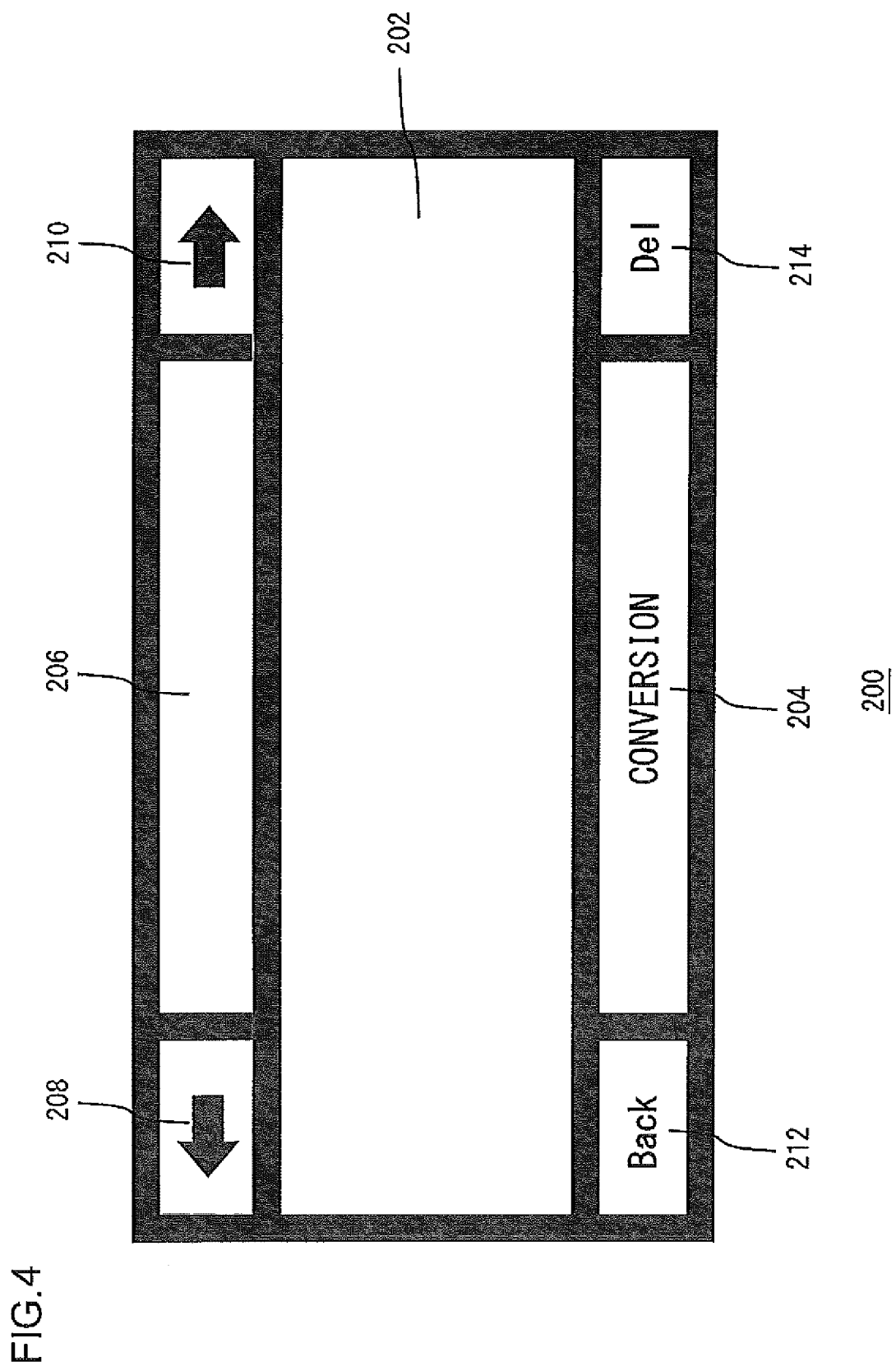
FIG. 4 shows the configuration of an alternative input screen.

FIG. 4 shows the configuration of an alternative input screen. A user input area 202 is an area where the user enters a character using the user's finger or a stylus pen. A conversion command field 204 is an area for requesting conversion of an input character. The user converts an input character by touching the conversion command field 204. A verification field 206 is an area for displaying the character entered in the user input area 202. Typically, the display size of the input character in the user input area 202 and the verification field 206 is larger than the display size of the input character in the input field in the content.

A leftward movement command field 208 and a rightward movement command field 210 are fields for directing the movement of a cursor indicating the position of entering a character in the verification field 206. A backward movement command field 212 is a command area for directing the cursor in the verification field 206 to go backward and requesting the deletion of the character provided in the verification field 206. A deletion command field 214 is a command area for requesting the deletion of character at the cursor position and the subsequent characters in the verification field 206. Reference is made back to FIG. 3.

In response to a character rendering command communicated from the command acquisition unit 52, the alternative input screen configuration unit 62 configures image data for the character that should be displayed on the location in the user input area 202 touched by the user, and sends the image data to the alternative input screen display unit 64.

When the input character string is mapped by the converter unit 60 to a specified character, the alternative input screen configuration unit 62 causes the specified character to be displayed at the cursor position of the verification field 206 by sending the image data for the specified character (destination of mapping) to the alternative input screen display unit 64. Further, the alternative input screen configuration unit 62 directs the alternative input screen display unit 64 to delete the input character mapped to the specified character from the user input area 202. Along with this, the alternative input screen configuration unit 62 causes the specified character to be displayed in the input field 302 by also sending the image data for the specified character to the transcription unit 66.

When the command acquisition unit 52 detects that the conversion command field 204 is touched by the user, the alternative input screen configuration unit 62 communicates a request to convert the character string provided in the verification field 206 to the converter unit 60 so as to acquire candidates of conversion. The alternative input screen configuration unit 62 causes the candidates of conversion to be displayed in the alternative input screen 200 by sending the image data for the candidates of conversion to the alternative input screen display unit 64.

When the command acquisition unit 52 detects user touch designating a particular destination character string from the candidates of conversion, the alternative input screen configuration unit 62 changes the input character string in the verification field 206 by sending image data for the destination character string to the alternative input screen display unit 64. Along with this, the alternative input screen configuration unit 62 changes the input character string provided in the input field 302 to the destination character string by sending the image data for the destination character string to the transcription unit 66.

When the command acquisition unit 52 detects that the leftward movement command field 208 or the rightward movement command field 210 is touched by the user, the alternative input screen configuration unit 62 communicates the destination of cursor movement in the verification field 206 to the alternative input screen display unit 64 so as to move the cursor in the verification field 206 left or right as appropriate. Typically, the right or left movement is used to refer to a character string toward the beginning no longer displayed as a result of a long character string being provided in the verification field 206, or to change the character string being entered in the verification field 206.

Further, when the command acquisition unit 52 detects that the backward movement command field 212 or the deletion command field 214 is touched by the user, the alternative input screen configuration unit 62 communicates a command to delete the character string provided in the verification field 206 and the input field 302 to the alternative input screen display unit 64 and the transcription unit 66 as appropriate. In this way, synchronization between the verification field 206 and the input field 302 is maintained.

The alternative input screen display unit 64 displays the alternative input screen 200, transparently superimposing the screen 200 in front of the content such as a web page displayed on the display 46. Typically, the alternative input screen display unit 64 displays the alternative input screen 200 on the entirety of the display 64. Alternatively, the alternative input screen display unit 64 may display the alternative input screen 200 superimposed on the entirety of a content displayed on the display 46. More specifically, the alternative input screen display unit 64 identifies the colors of pixels (hereinafter, referred to as "corresponding pixels" as appropriate) used to display the content in the background and occurring at pixel positions where the alternative input screen 200 should be displayed. The alternative input screen display unit 64 then refers to the corresponding color storage unit 58 so as to determine pixel values of pixels that should be used to display the alternative input screen 200 so that the pixels are rendered in colors complementary to the colors provided in the corresponding pixels in the content.

Subsequently, the alternative input screen display unit 64 uses a publicly known transparency setting technique such as alpha blending to condition the pixel values of the alternative input screen 200 so as to display the alternative input screen 200 superimposed on the content. The pixel values for the input character in the user input area 202 and for the specified character in the verification field 206 are also determined as described above and transparency is set accordingly. Transparency assumed to be proper may be determined based on corporate knowledge, an experiment using the communication system 100, etc., allowing for viewability of the content and the alternative input screen 200.

The transcription unit 66 acquires data based on the user input in the alternative input screen 200 from the alternative input screen configuration unit 62 and reflects the content of input in the alternative input screen 200 in the input field 302. For example, the transcription unit 66 acquires data for the specified character determined based on the user input character or data for the destination character string determined by the user, so as to provide the specified character or the destination character string in the input field 302. The transcription unit 66 also acquires data related to the content of change in the verification field 206 and changes the character string provided in the input field 302 in association with the change.

As mentioned above, the input screen configuration unit 62 sends the data based on the user input to the transcription unit 66 without waiting for a user command requesting the data to be set in the input field 302. The transcription 66 also reflects the data acknowledged from the alternative input screen configuration unit 62 in the input field 302 without waiting for a user command. In other words, the verification field 206 and the input field 302 are synchronized without the user's conscious intervention.

A description will be given of the above operation with reference to the flowcharts of FIGS. 5 through 7. Along with the flowcharts, FIGS. 8 through 15, which show screen images displayed on the display 46, will also be referred to.

Figure 5:
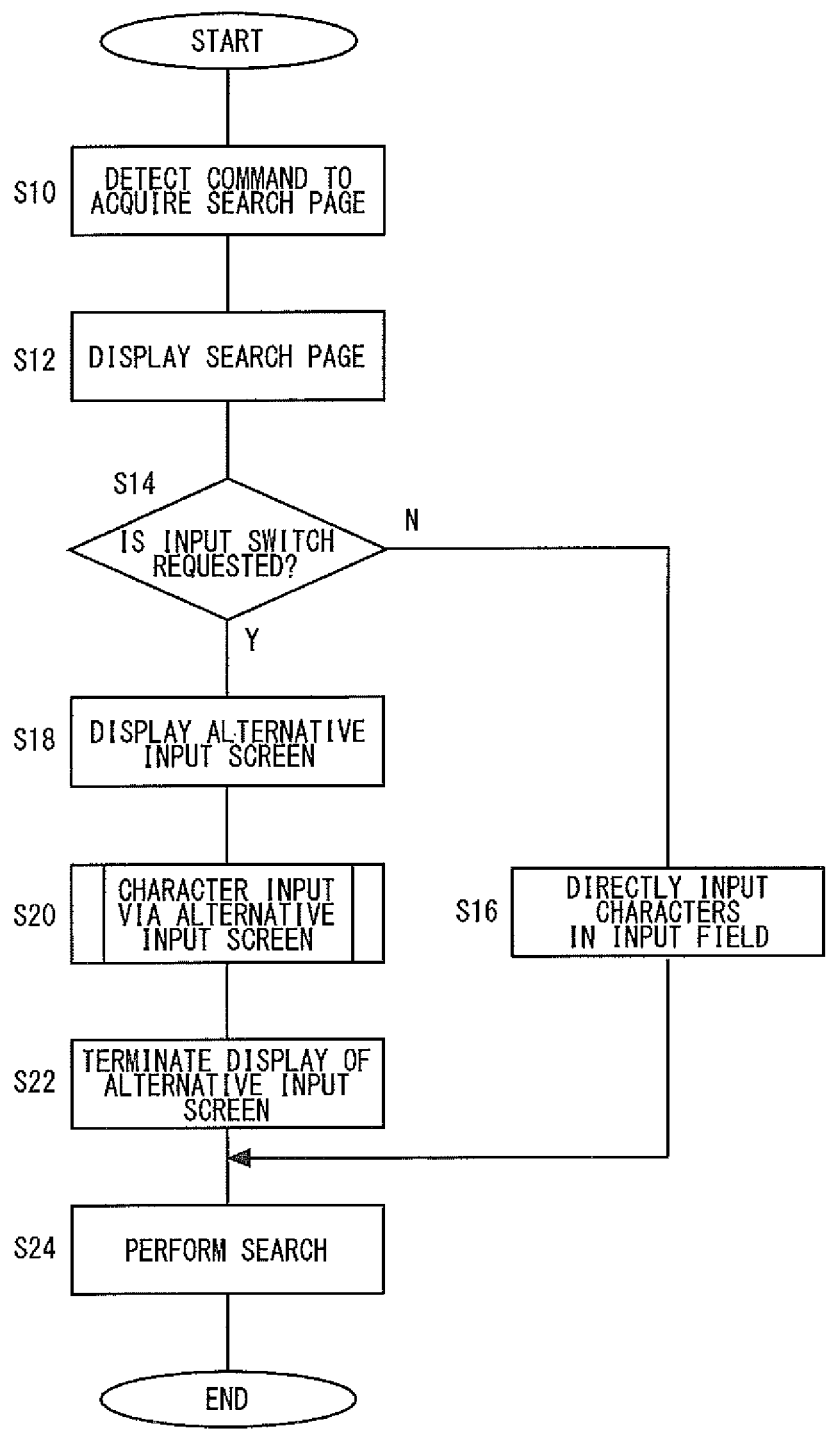
FIG. 5 is a flowchart showing the operation of the mobile information terminal.

FIG. 5 is a flowchart showing the operation of the mobile information terminal 40. The command acquisition unit 52 detects a user command to acquire a search request page via the controller 44 (S10). The content acquisition unit 54 acquires a search request page from the web server 10 via the communication unit 50. The content display unit 56 causes the display 46 to display the search request page (S12).

Figure 8:
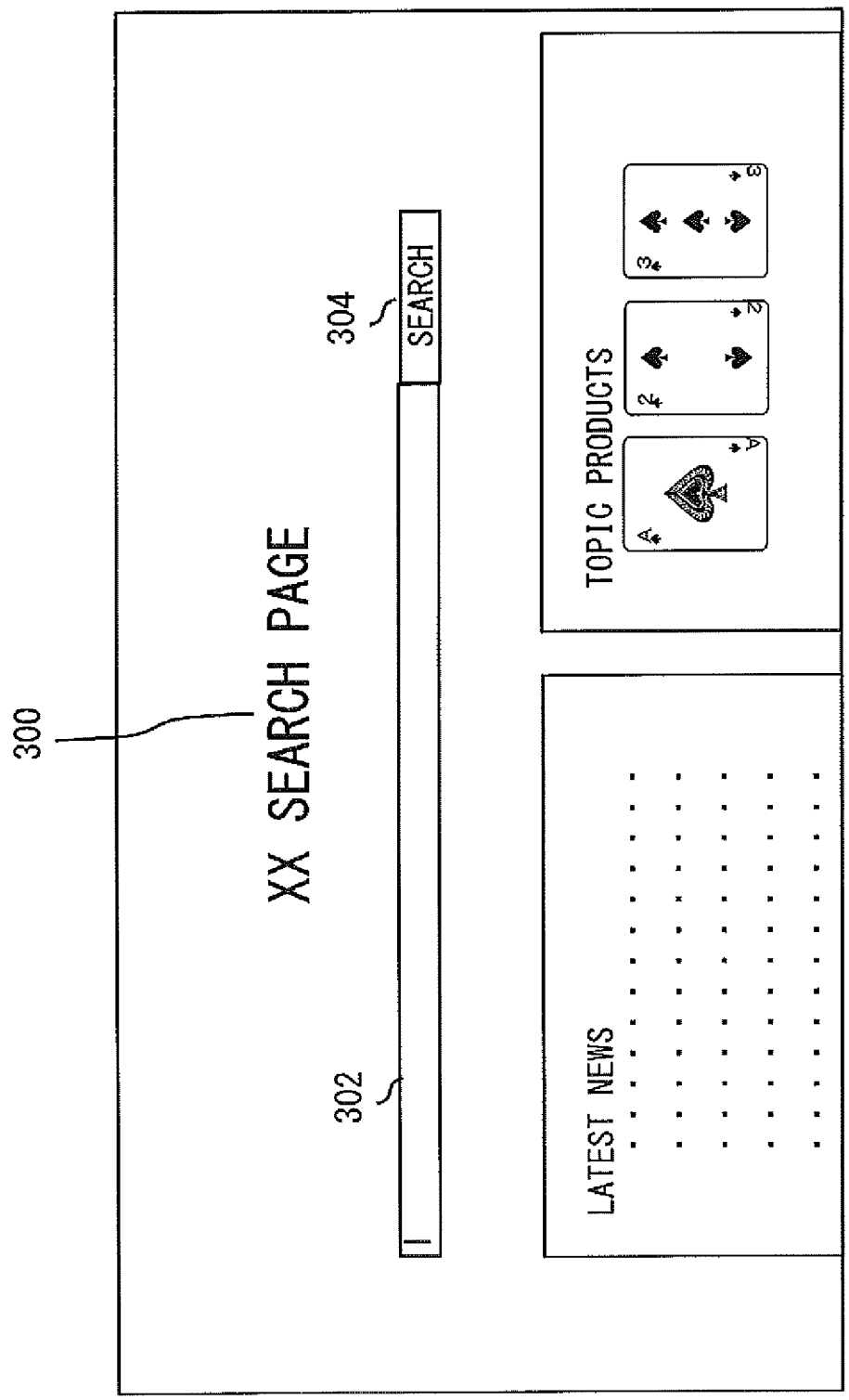
FIG. 8 shows a screen image displayed on the display.

FIG. 8 shows a search request page 300 displayed in S12 on the entirety of the display 46. The search request page 300 includes an input field 302 for providing a search character string, a search button 304 for triggering the execution of search, and various information such as "latest news", "topic products", etc. When the user touches the input field 302, an input cursor indicating the position of entering a search character string is displayed. Reference is made back to FIG. 5.

Figure 9:
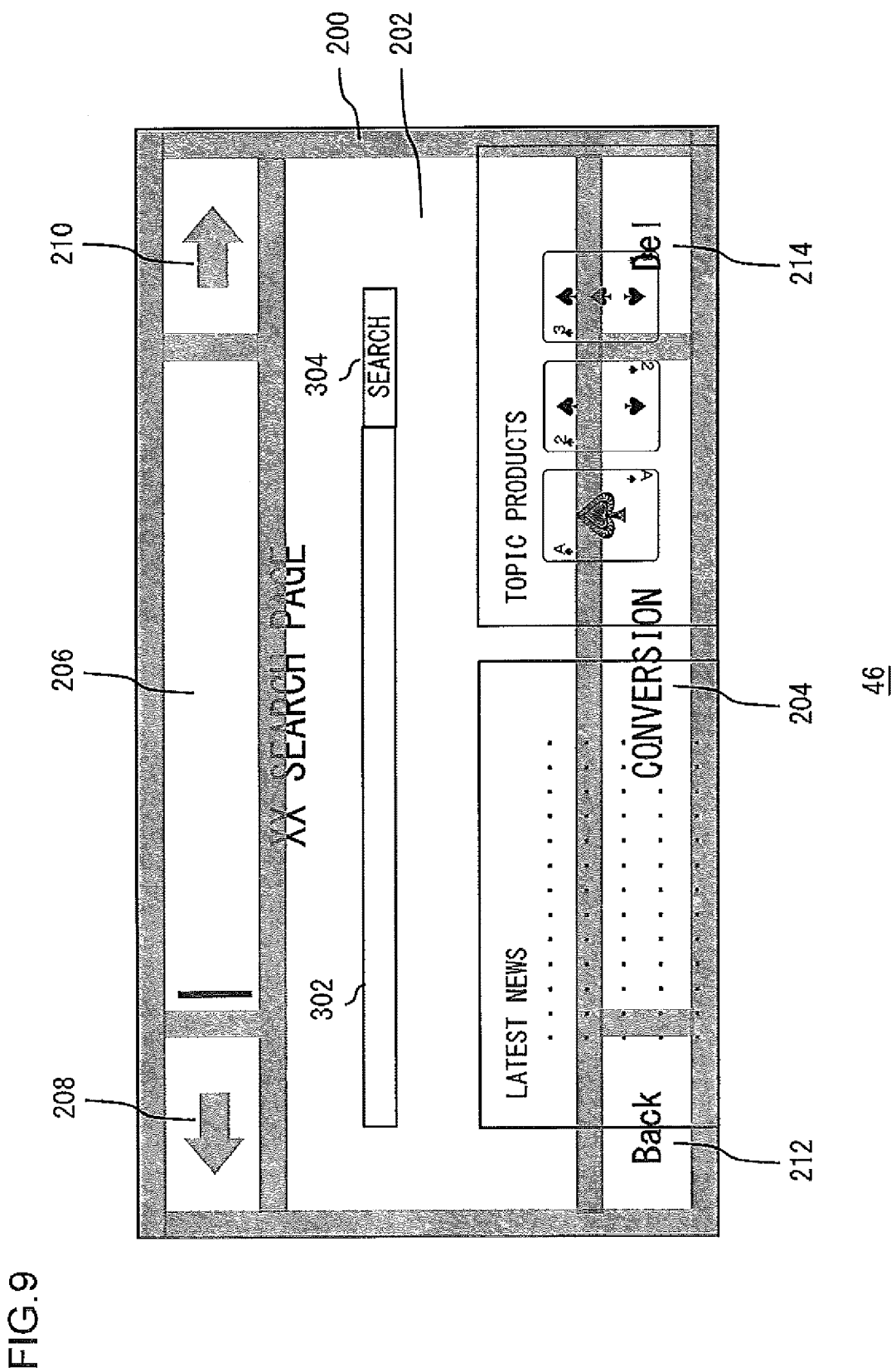
FIG. 9 shows a screen image displayed on the display.

When the user does not press the input switch button of the controller 44 (N in S14), the user directly enters a search character string in the input field 302 (S16). When the user presses the input switch button after touching the input field 302 (Y in S14), the command acquisition unit detects the operation. The alternative input screen configuration unit 62 configures an alternative input screen 200 for the input field 302. The alternative input screen display unit 64 displays the alternative input screen 200 transparently as superimposed in front of the search request page 300 (S18). FIG. 9 shows that the alternative input screen 200 is transparently displayed in S18 in front of the search request page 300 and on the entirety of the display 46. Reference is made back to FIG. 5.

Figure 10:
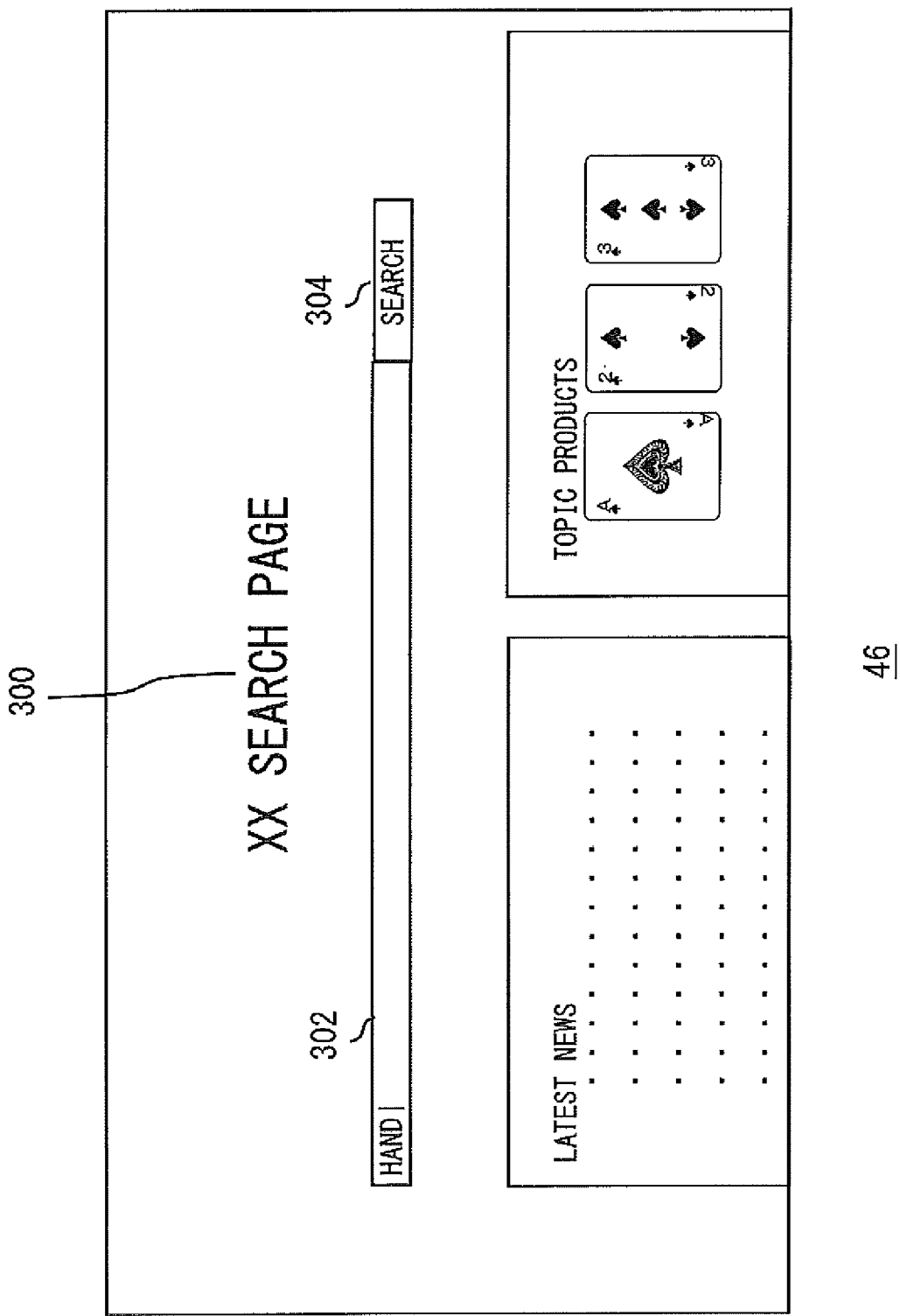
FIG. 10 shows a screen image displayed on the display.

A search character string is then entered in the search request page 300 via the alternative input screen 200 (S20). Details of S20 will be described later. When the user finishes pressing the input switch button, the command acquisition unit 52 detects the operation. The alternative input screen configuration unit 62 notifies the alternative input screen display unit 64 that the display of the alternate input screen 200 should be terminated, whereupon the alternative input screen display unit 64 finishes displaying the alternative input screen 200 on the display 64 (S22). FIG. 10 shows a screen in which the display of alternate input screen 200 is terminated in S22. The user input character "HAND" (Japanese kanji character meaning "hand" and corresponding to a kana character "t-e") is set up in the input field 302 via the alternative input screen 200. Details will be described later. Subsequently, the user initiates a search by pressing the search button 304 (S24).

Figure 6:
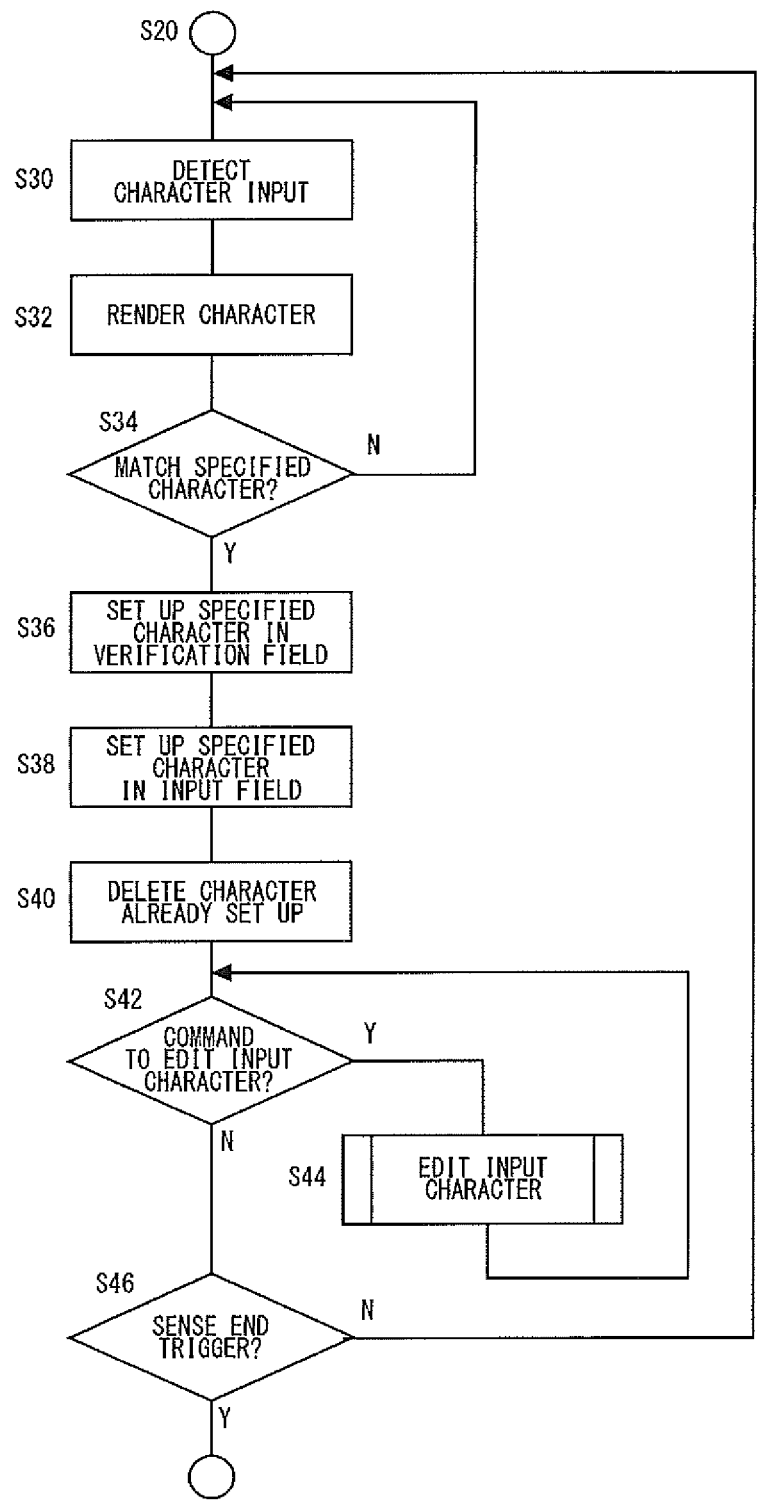
FIG. 6 is a flowchart showing the details of S20 of FIG. 5.

FIG. 6 is a flowchart showing the details of S20 of FIG. 5. The command acquisition unit 52 detects an input of a character by the user in the user input area 202 (S30). The alternative input screen configuration unit 62 provides an image of the input character. The alternative input screen display unit 64 displays the image of the input character in the user input area 202 (S32). If the input character does not match a specified character (N in S34), it means that the user is in the middle of entering characters so that control is returned to S30.

When the input character matches a specified character (Y in S34), the alternative input screen configuration unit 62 provides an image of the specified character that should be provided in the verification field 206. The alternative input screen display unit 64 displays the specified character in the verification field 206 (S36). Along with this, the transcription unit 66 displays the specified character in the input field 302 (S38). The alternative input screen display unit 64 deletes, from the user input area 202, the character already mapped to the specified character, i.e., the character already provided in the verification field 206 (S40).

Figure 11:
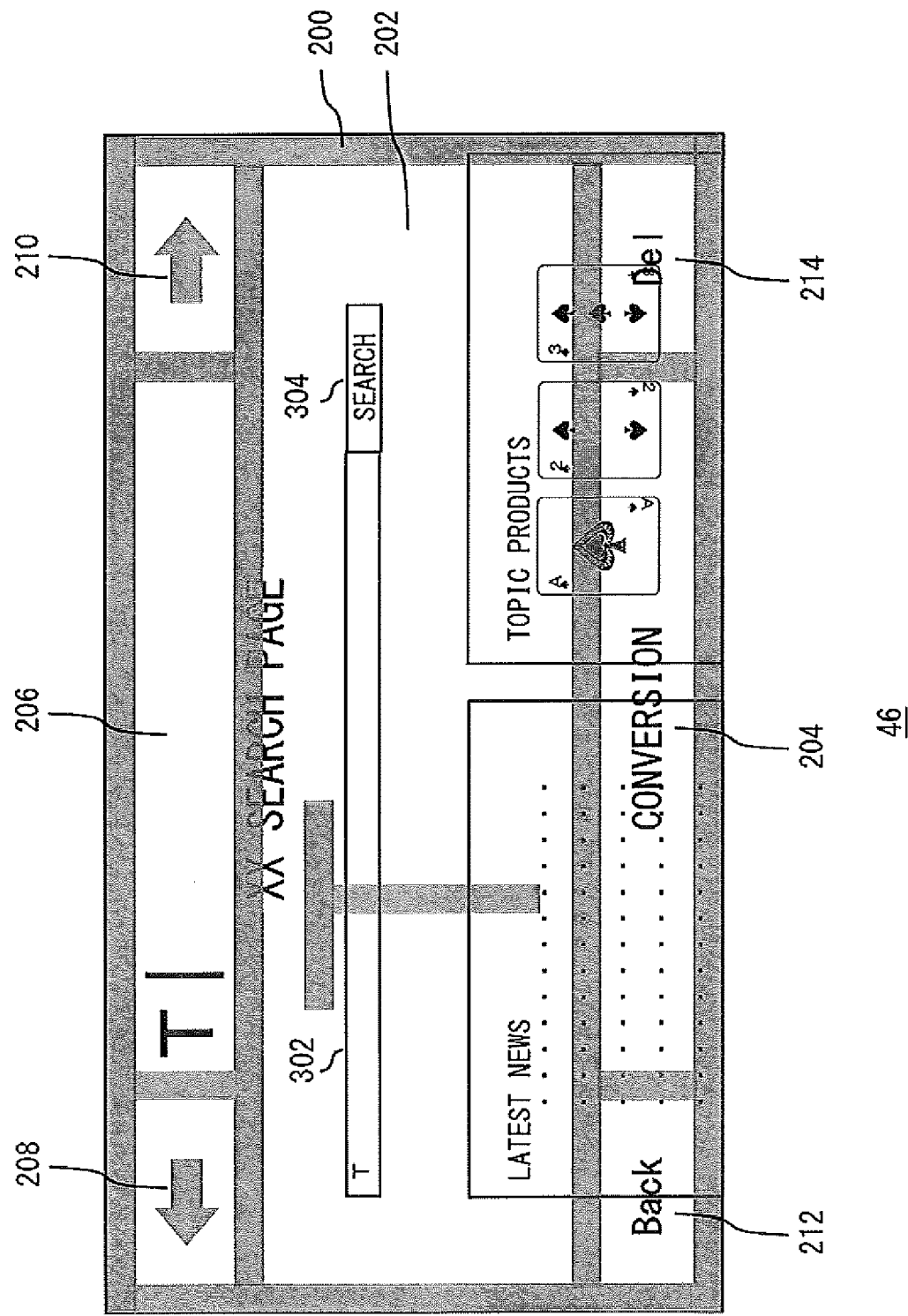
FIG. 11 shows a screen image displayed on the display.
Figure 12:
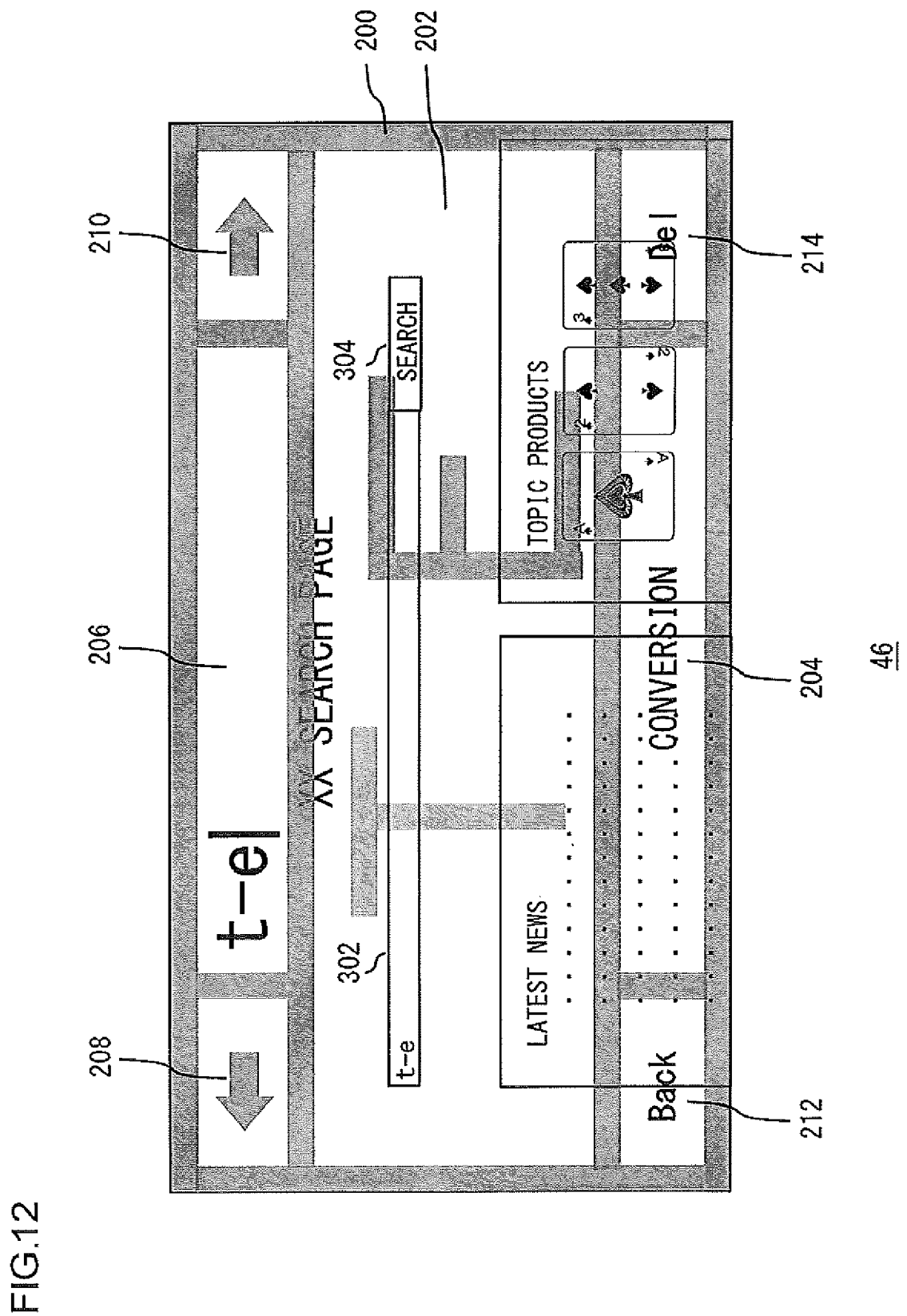
FIG. 12 shows a screen image displayed on the display.

FIG. 11 shows that the user enters letter "T" in the use input area 202 and the input character is reflected in the verification field 206 and the input field 302. FIG. 12 shows that the user continues from the state of FIG. 11 to enter letter "E", the letter is converted into "t-e (Japanese kana character)", and the input character is reflected in the verification field 206 and the input field 302. When the user enters "E", the alternative input screen display unit 64 configures the letter "T" already mapped to the specified character to become progressively more transparent until the letter is finally caused to disappear from view. By deleting an input character already mapped to a specified character from the user input area 202 as needed, the user can enter a long character string in the user input area 202 without being restricted by the size of the user input area 202. Reference is made back to FIG. 6.

When the user edits the input character provided in the verification field 206 by touching various command fields in the alternative input screen 200 (Y in S42), the process of editing the input character, described later, is performed (S44). When the process of editing the input character is not performed (N in S42), and when the user finishes pressing the input switch button, the command acquisition unit 52 senses it as an end trigger (Y in S46), whereupon the process of S20 in FIG. 5 is terminated. If an end trigger is not sensed (N in S46), control is returned to S30.

Figure 7:
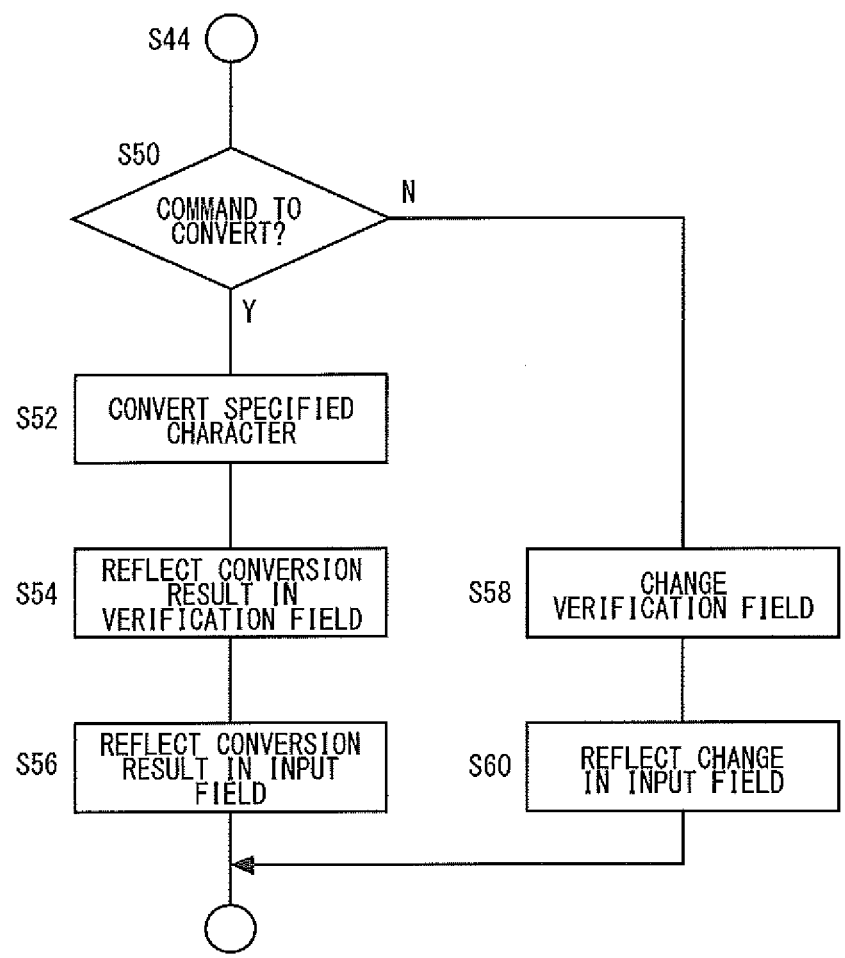
FIG. 7 is a flowchart showing the details of S44 of FIG. 6.

FIG. 7 is a flowchart showing the details of S44 of FIG. 6. When the user touches the conversion command field 204 (Y in S50), the alternative input screen configuration unit 62 provides the converter unit 60 with a request for conversion into a specified character so as to acquire candidates of conversion (S52). The alternative input screen display unit 64 displays the candidates of conversion on the alternative input screen 200. When the user selects one of the candidates of conversion, the alternative input screen configuration unit 62 acquires the selected conversion candidate as a destination character string. The alternative input screen display unit 64 reflects the result of conversion in the verification field 206 by changing the input character in the verification field 206 to the destination character string (S54). Along with this, the alternative input screen display unit 64 reflects the result of conversion in the input field 302 by chanting the input character in the input field 302 to the destination character string (S56).

Figure 13:
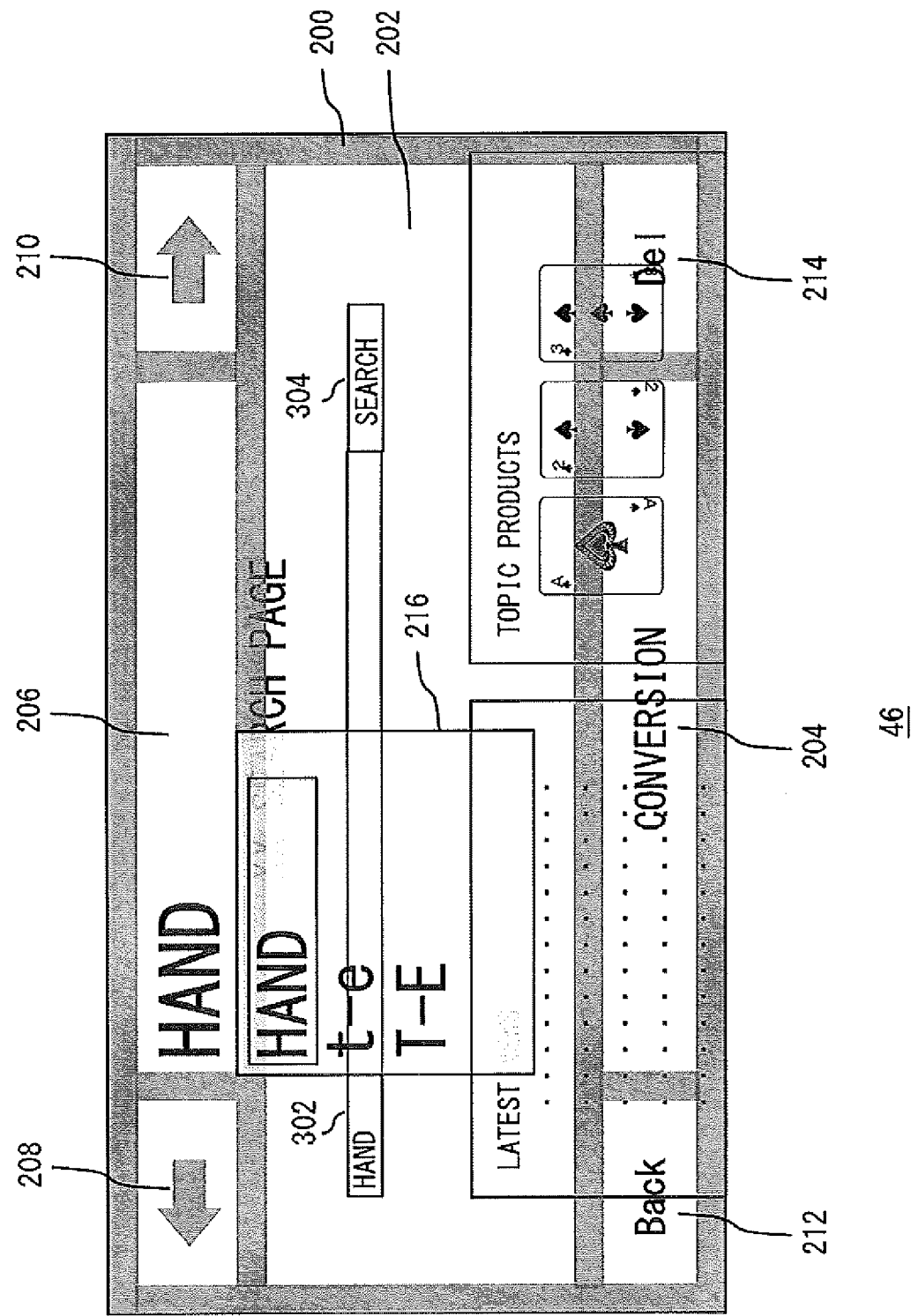
FIG. 13 shows a screen image displayed on the display.

FIG. 13 shows that a change candidate area 216 is displayed on the alternative input screen 200. The change candidate area 216 may be displayed transparently like the alternative input screen 200. The figure shows that "HAND" (Japanese kanji character meaning "hand" and corresponding to a kana character "t-e") is selected as a destination character string from the candidates of conversion in the change candidate area 216 and that the destination character string is reflected in the verification field 206 and the input field 302. Reference is made back to FIG. 7.

When the user touches the leftward movement command field 208, the rightward movement command field 210, the backward command field 212, or the deletion command field 214 (N in S50), the alternative input screen configuration unit 62 changes the state of the verification field 206 as appropriate in accordance with the user operation. The alternative input screen display unit 64 displays the state of the verification field 206 as changed (S58). Along with this, the transcription unit 66 reflects the change in the verification field 206 in the input field 302 (S60).

Figure 14:
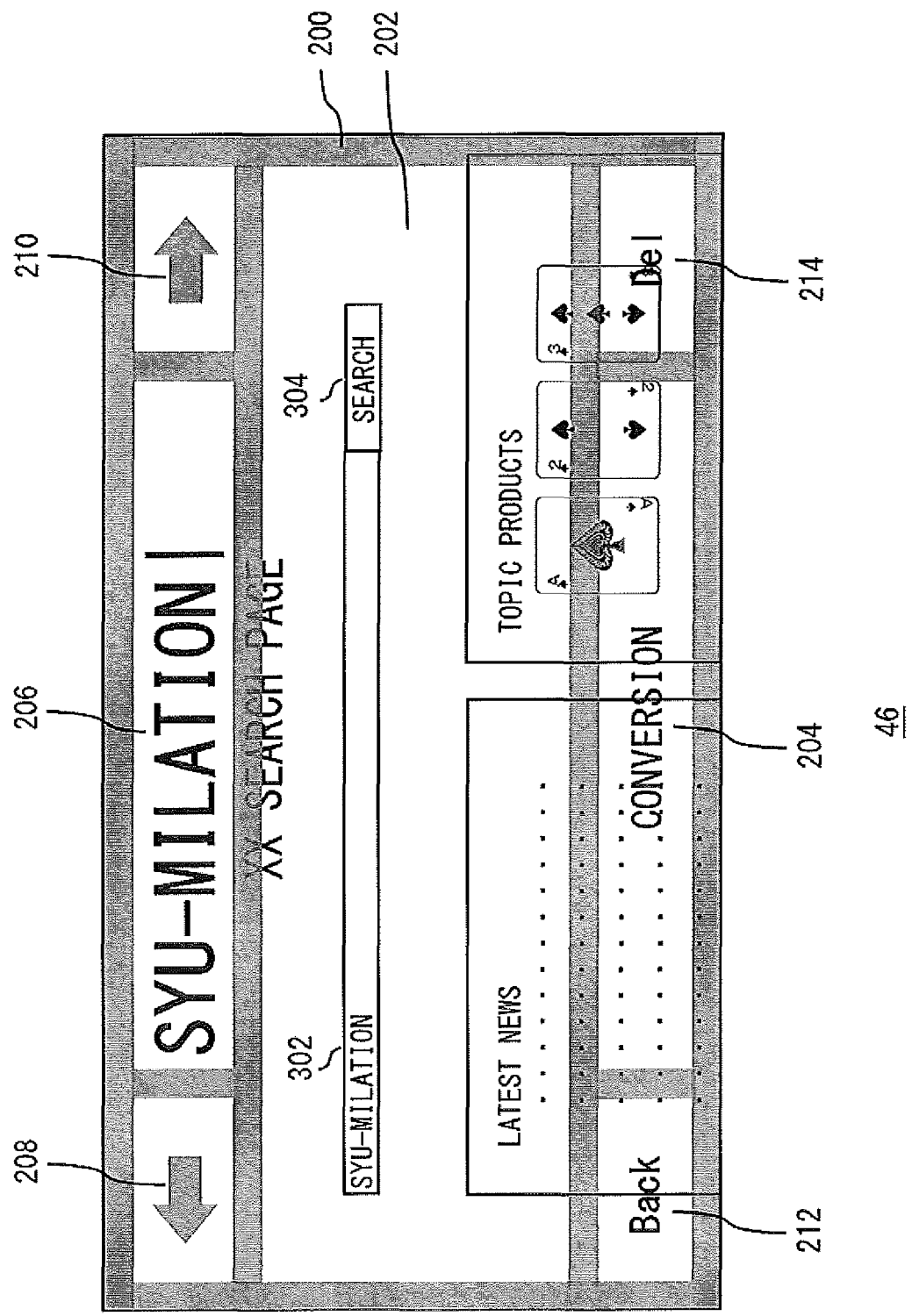
FIG. 14 shows a screen image displayed on the display.
Figure 15:
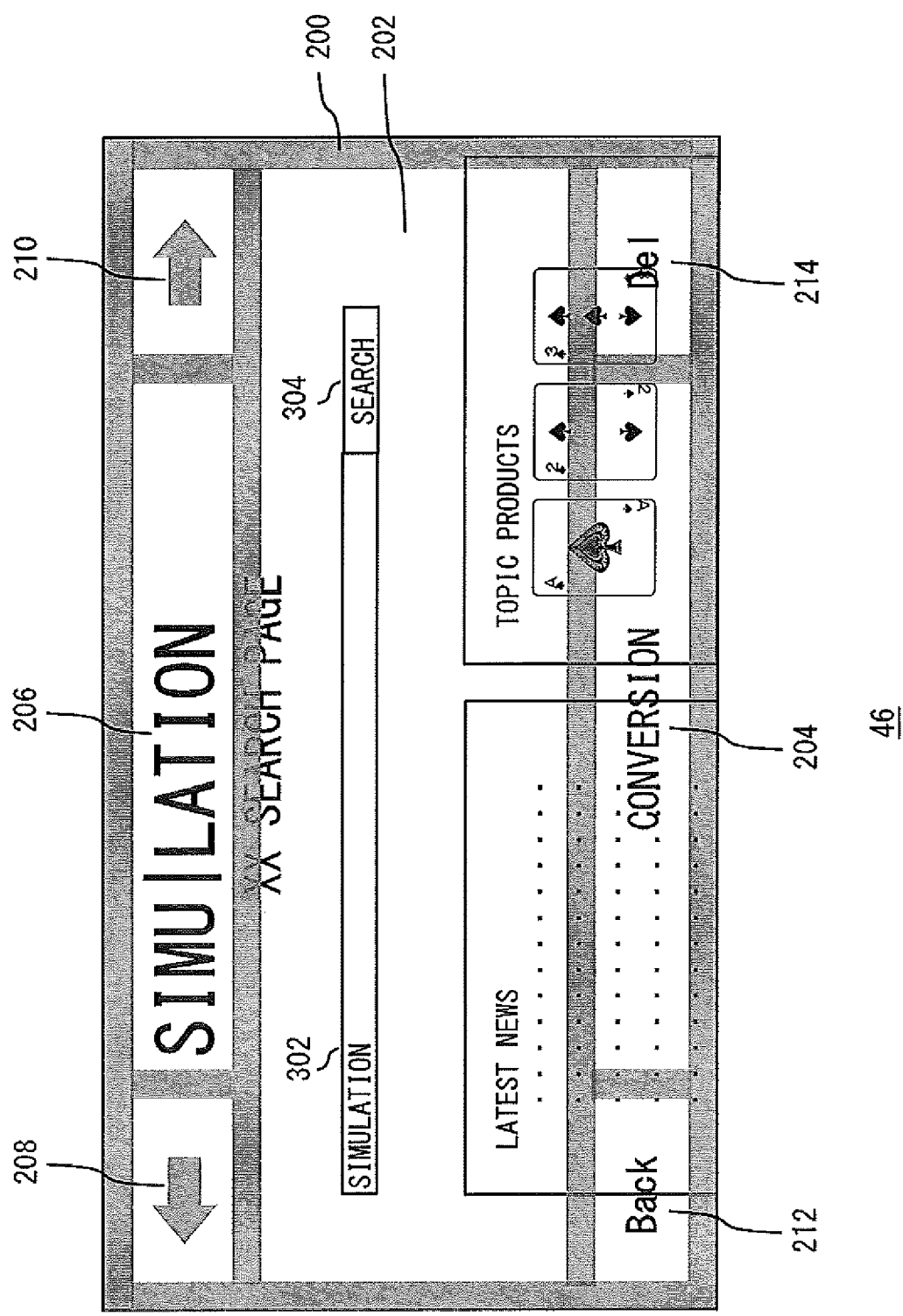
FIG. 15 shows a screen image displayed on the display.

FIG. 14 shows that an error character "SYU-MILATION (Japanese character intended to mean 'SIMULATION')" is provided in the verification field 206 and the input field 302. FIG. 15 shows that the user continues from the state of FIG. 14 to change the input character string by touching the leftward movement command field 208 or the deletion command field 214. The content of editing in the verification field 206 by the user is reflected as needed in the input field 302 by the transcription unit 66. Some characters or the entirety of the character string in the verification field 206 may be selected by user touching or sliding in the verification field 206. The selected input character string may be subject to re-conversion by touching the conversion command field 204 after the character string in the verification field 206 is selected.

The mobile information terminal 40 according to the embodiment provides information input interface with greater user convenience even when the screen size is limited. Meanwhile, the content continues to be displayed by fully exploiting the screen area. More specifically, the embodiment provides information input interface that allows a user to enter and edit a character in an easy-to-view display size. By displaying the information input interface transparently as superimposed in front of the content, the amount of information of content visible to the user is maintained.

In further accordance with the mobile information terminal 40, user input information in the alternative input screen 200 and the details of editing the input information are reflected in the input field 302 without requiring any user command so that synchronization is maintained. This eliminates the need for the user to be aware of transfer of information from the alternative input screen 200 to the input field 302. The user can enter information in the alternative input screen 200 as if directly entering information in the input field 302.

Further, the alternative input screen 200 includes a verification field 206 in which is provided input information identical to the input information provided in the input field 302. Synchronization is maintained between the information in the verification field 206 and the information in the input field 302. In this way, the user desiring to edit input information provided in the input field 302 may edit the input information in the verification field 206 in which viewability of input characters is high. Accordingly, user convenience is improved.

In further accordance with the mobile information terminal 40, the alternative input screen 200 is rendered such that colors complementary to the colors of the background content are determined as the colors of the alternative input screen 200. Transparency is further set in the alternative input screen 200. When the alternative input screen 200 in front is made transparent, the user may find it difficult to distinguish the screen 200 from the background content. By providing colors complementary to the background colors as colors in which the alternative input screen 200 is rendered, high contrast between the foreground and the background is maintained even if the alternative input screen 200 is made transparent. In other words, this makes it easy for the user to distinguish between the alternative input screen 200 in front and the background content so that user convenience is improved.

Further, the mobile information terminal 40 is provided with an input switch button so that the user desiring to enter information in a content may press the input switch button as needed so as to display the alternative input screen 200. If a content is displayed large so that it is easy for the user to enter characters in an input field in the content, the user can enter characters directly in the input field. This means that the user can select whether to enter information in the input field directly or enter information via the alternative input screen 200, depending on the difficulty of entering information in each content.

Described above is an explanation of the embodiment. The embodiment is intended to be illustrative only and it will be obvious to those skilled in the art that various modifications to constituting elements and processes could be developed and that such modifications are also within the scope of the present invention. A description will now be given of variations.

The first variation will be described. In the embodiment, the alternative input screen 200 is described as being a user interface adapted to acknowledge character input. Alternatively, the alternative input screen 200 may acknowledge input other than that of characters. For example, the mobile information terminal 40 may acknowledge an image content rendered by the user in the alternative input screen 200 (e.g., a picture) and provide the image in an image configuration area in the content. The same advantage as already described will also be available in this variation.

The second variation will be described. The alternative input screen 200 described in the embodiment as acknowledging character input and another alternative input screen adapted to acknowledge input of data other than characters may both be displayed superimposed in front of the content at the same time. Alternatively, a plurality of alternative input screens may be displayed superimposed on each other. The variation will be suitable when the content accepts input data of various formats.

The third variation will be described. In the embodiment, the alternative input screen display unit 64 is described as determining colors complementary to the colors provided in the corresponding pixels in the background content as the colors of the pixels used to display the alternative input screen 200. In this variation, surrounding pixels located around the corresponding pixels in the content may be identified so that colors complementary to the colors obtained by averaging the colors of the corresponding pixels and those of the surrounding pixels (hereinafter, referred to as "averaged colors") may be determined as the colors of the pixels used to display the alternative input screen 200. By allowing for the surrounding pixels in addition to the corresponding pixels in determining the colors of the pixels used to display the alternative input screen 200, colors that evenly exhibit high contrast to the corresponding pixels and to the surrounding pixels can be provided in the pixels of the alternative input screen 200.

Figure 16A:
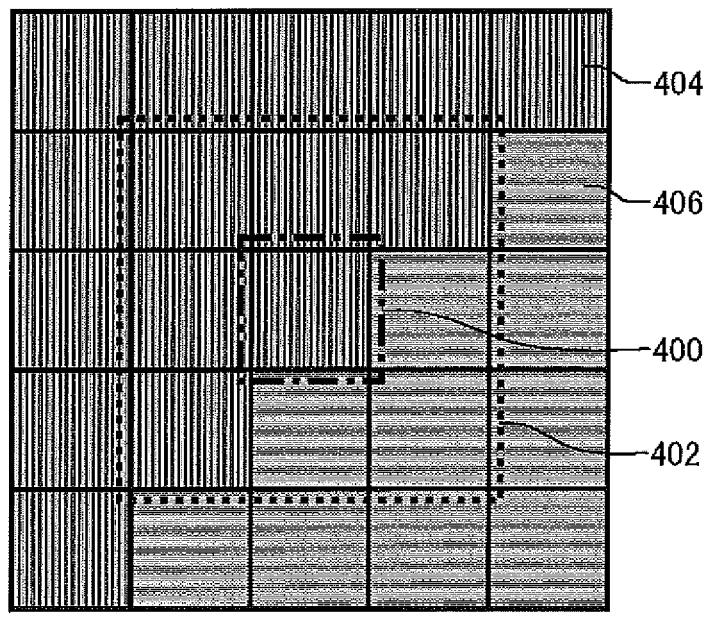
FIGS. 16A and 16B show a pixel image of a background content.
Figure 16B:
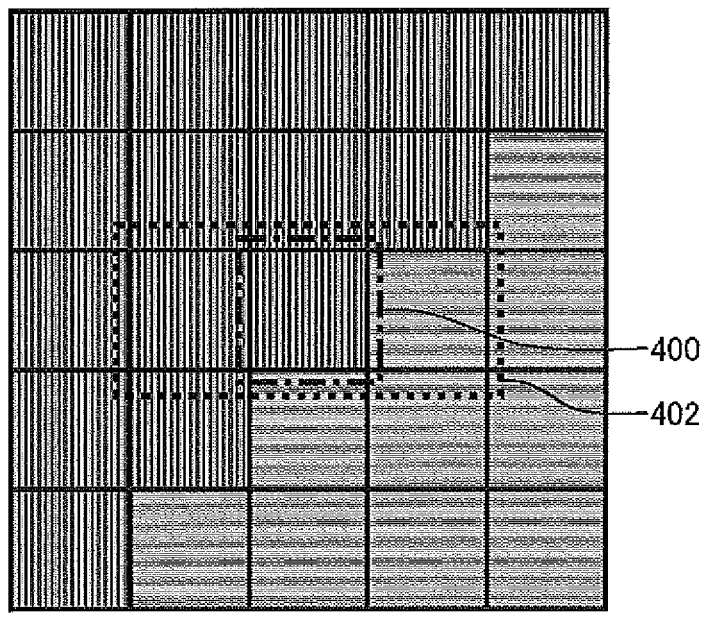

FIG. 16A shows a pixel image of a background content. A pixel 400 located at a position of rendering in the figure indicates a pixel in the content located where a corresponding pixel in the alternative input screen 200, for which pixel a color should be determined, (hereinafter, referred to as "pixel subject to rendering") is located. A computation range 402 indicates a range of surrounding pixels for which their colors in the content are identified in order to identify averaged colors. In the figure, 6 of the 9 pixels in the computation range 402 are rendered in a first color 404 and the other 3 pixels are rendered in a second color 406. It is given here that the RGB components of the first color 404 are such that "R=255, G=0, B=0" and the RGB components of the second color 406 are such that "R=51, G=102, B=255".

In this case, a moving average of the first color 404 for the 6 pixels and the second color 406 for the 3 pixels is identified as an averaged color. In this case, a color having the following RGB components is identified as an averaged color.

$$R:((255\times6)+(51\times3))/9=187$$

$$G:((0\times6)+(102\times3))/9=34$$

$$B:((0\times6)+(255\times3))/9=85$$

Next, a color complementary to the averaged color is determined as the color of the pixel subject to rendering. This may be followed by a process of appropriately setting transparency as already described in the embodiment.

In FIG. 16A, surrounding pixels located on the left, right, top, and bottom of the pixel 400 located at a position of rendering define the computation range 402. Alternatively, only those pixels located on the left and right of the pixel 400 located at a position of rendering may define the computation range 402. In other words, the computation range 402 may be defined by a line instead of a block.

The fourth variation will be described. In the third variation, the surrounding pixels located on the left, right, top, and bottom of the pixel 400 located at a position of rendering or the surrounding pixels located on the left and right of the pixel 400 located at a position of rendering define the computation range 402, in addition to the pixel 400 located at a position of rendering. In this variation, a range of scanned surrounding pixels, i.e., a range of surrounding pixels for which colors have already been identified may define the computation range 402, in addition to the pixel 400 located at a position of rendering. Generally, the color of a given pixel in an image is likely to be a color similar to the color of surrounding pixels. A proper color that should be provided for the pixel subject to rendering could be determined even if only some of the surrounding pixels are allowed for. According to this variation, the system resource and the volume of computation required to determine colors could be reduced.

Figure 17A:
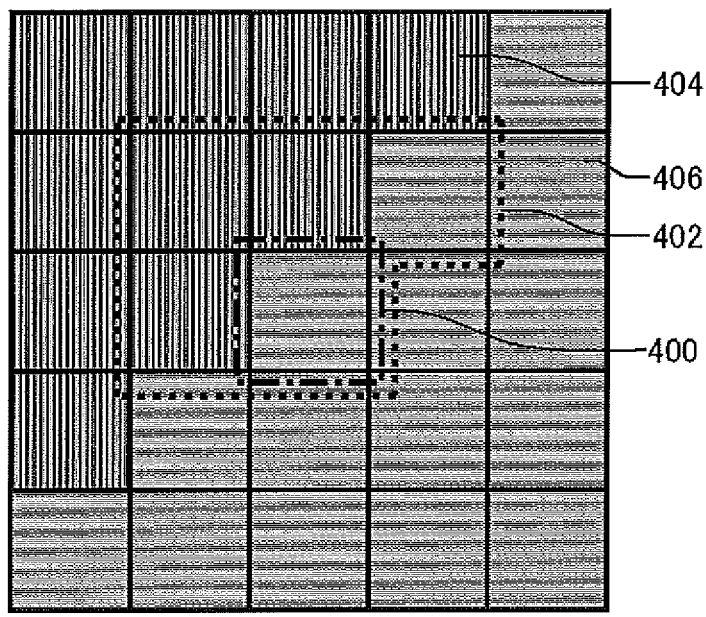
FIGS. 17A and 17B show a pixel image of a background content.
Figure 17B:
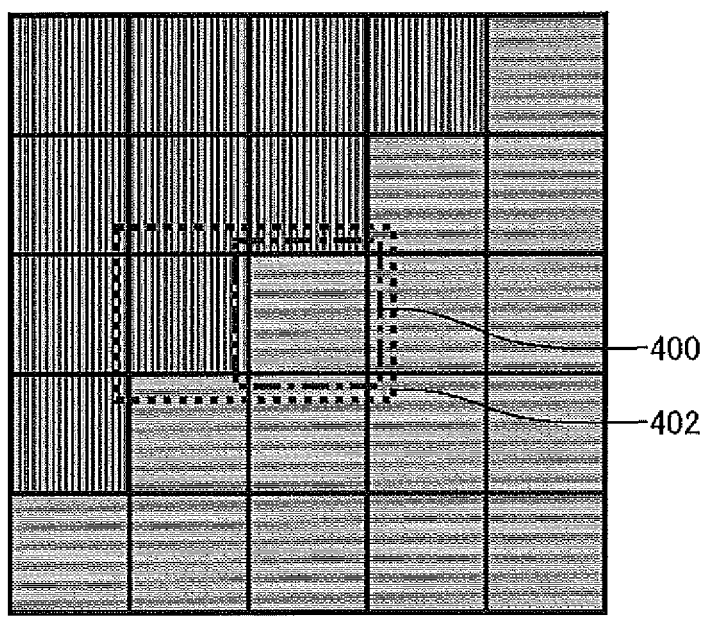

FIG. 17A shows a pixel image of a background content. In the figure, it is assumed that the image is scanned from left to right and from top to bottom of the display. The computation range 402 of the figure comprises 4 surrounding pixels located above and to the left in addition to the pixel 400 located at a position of rendering. Alternatively, as shown in FIG. 17B, a single surrounding pixel located to the left of the pixel 400 located at a position of rendering may define the computation range 402 in addition to the pixel 400 located at a position of rendering.

The fifth variation will be described. In the embodiment, the pixel values of the pixels of the alternative input screen 200 are determined so that the pixels are rendered in colors complementary to the colors of the corresponding background pixels (hereinafter, referred to as "background colors"). In this variation, the pixel values of the pixels of the alternative input screen 200 may be determined such that the pixels are rendered in the background colors but with a brightness different from that of the background colors by a predetermined level, so that the contrast against the background is clearly defined. Since human eyes are more susceptible to variation in brightness than to variation in color, this makes it easier, as in the case of providing comlementary colors, for the user to make distinction from the background content by providing colors obtained by changing the brightness of the background colors in the alternative input screen 200.

More specifically, a predetermined offset value may be added if the brightness of a background color is lower than a predetermined reference value. Meanwhile, a predetermined offset value may be subtracted if the brightness of a background color is equal to or higher than the predetermined reference value. For example, it will be assumed that the brightness is a value in a range "0-255", the reference value is "128", which is intermediate in the brightness range, and the offset value is "127". In this case, if the brightness of a background color is "5", the brightness of the color of the alternative input screen 200 rendered on the background color will be "5+127=132". If the brightness of a background color is "200", the brightness of the color of the alternative input screen 200 rendered on the background color will be "200−127=73".

In an alternative method, if the brightness of a background color is lower than a predetermined reference value, the brightness may be mapped to a specified value equal to above the reference value, and, if the brightness of a background color is equal to or higher than a predetermined reference value, the brightness may be mapped to a specified value lower than the reference value. For example, it will be assumed that the brightness is a value in a range "0-255", the reference value is "128", which is intermediate in the brightness range, and the specified values are "0" and "255". In this case, if the brightness of a background color is "5", the brightness of the color of the alternative input screen 200 rendered on the background color will be "255". If the brightness of a background color is "200", the brightness of the color of the alternative input screen 200 rendered on the background color will be "0". This approach does not require adjustment using an offset value and so reduces the volume of computation required to determine the brightness.

The hue of the pixel 400 located at a position of rendering, which is not mentioned in detail in this variation, may be a hue obtained by appropriately adjusting the hue of the background color or the same as that of the background color. Consideration of surrounding pixels described in the third and fourth variations may be employed in determining the brightness according to the fifth variation. For example, the average brightness in the surrounding pixels may be identified so that the color obtained by varying the average brightness by a certain level may be used as the color of the pixel subject to rendering.

The sixth variation will be described. In the embodiment, transparency is described as being set in the entirety of the alternative input screen 200. Alternatively, transparency may be set in at least part of the alternative input screen 200. For example, the frames and characters used to present the alternative input screen 200, the input characters provided in the user input area 202, the specified characters provided in the verification field 206, etc. may remain nontransparent. Viewability of those parts that are not set to be transparent is improved. Areas set to be transparent may be determined based on corporate knowledge, an experiment using corporate, etc., allowing for the viewability of the alternative input screen 200, the viewability of the background content, the volume of computation required to set transparency, etc.

The seventh variation will be described. In the embodiment, the alternative input screen 200 is described as being displayed according to user operation of switching the input. In this variation, the alternative input screen 200 may be displayed depending on the size of the input field in the content even if the user does not perform an operation of switching the input. Typically, it is desirable that the alternative input screen 200 be automatically displayed when the input field in the content is of a predetermined size or smaller. For example, the alternative input screen 200 may be displayed when the input field is of a predetermined size ratio or lower in relation to the size of the user input area 202 and when the user selects that input field. This eliminates the need for user effort to press the input switch button and improves convenience in information input. When input via the automatically displayed alternative input screen 200 is not desired by the user, the display of the automatically displayed alternative input screen 200 may be terminated by pressing the input switch button.

Any combination of the embodiment and a variation will also be useful as an embodiment of the present invention. A new embodiment created by a combination will provide the combined advantages of the embodiment and the variation as combined.

It will be understood to a skilled person that the functions achieved by the constituting elements recited in the claims are implemented either alone or in combination by the constituting elements shown in the embodiment and the variation.

DESCRIPTION OF THE REFERENCE NUMERALS 10 web server, 20 communication network, 30 access point, 40 mobile information terminal, 42 speaker, 44 controller, 46 display, 50 communication unit, 52 command acquisition unit, 54 content acquisition unit, 56 content display unit, 58 corresponding color storage unit, 60 converter unit, 62 alternative input screen configuration unit, 64 alternative input screen display unit, 66 transcription unit, 100 communication system The present invention is applicable to information processing devices in which a user is allowed to enter data.

The invention claimed is:

1. An information input device comprising:
a display unit configured to display a user interface for acknowledging user input information in a content including an input field displayed on a screen, by accepting an operation on the screen, the user interface being displayed by way of at least a gesture input area and a verification field, separate from the gesture input area, each defined by translucent border lines that appear superimposed in front of the content, and where the gesture input area includes a transparent region that overlies the input field;
a converter unit configured to analyze the user input information received within the transparent region of the gesture input area and to recognize that the user input information represents one or more characters of one or more languages, where the gesture input area is a significantly larger area than an area of the input field; and
a transcription unit configured to provide, in the input field in the content, the one or more characters from the user input information acknowledged in the user interface, wherein:
the display unit displays: (i) the user input information in the transparent region of the gesture input area such that the user input information overlies the input field, and (ii) the one or more characters in the verification field of the user interface, in a size larger than in the input field, where the verification field allows the user to verify the one or more characters recognized from the user input information provided in the gesture input area,
the display unit permits the user to edit the one or more characters in the verification field using text input keys in order to change and accept the one or more characters, and
the transcription unit updates the one or more characters to the changed one or more characters in the input field in the content.

2. The input information device according to one of claim 1, wherein the transcription unit provides, when the user input information is acknowledged in the user interface, the acknowledged user input information in the input field in the content as needed without waiting for a user command requesting the input information to be provided in the input field.

3. The information input device according to claim 1, wherein the display unit renders the user interface using a color complementary to a color provided in the content so that the user can easily distinguish between the user interface and the content that represents a background.

4. The information input device according to claim 3, wherein the display unit determines a color of a specified pixel showing at least part of the user interface such that a pixel in the content corresponding to the specified pixel is identified and a color complementary to a color provided in the pixel identified as corresponding is provided as the color of the specified pixel.

5. The information input device according to claim 4, wherein, when the display unit identifies a corresponding pixel in the content, the display unit also identifies surrounding pixels located around the corresponding pixel and determines a color complementary to a color obtained by averaging colors of the corresponding pixel and the surrounding pixels as being the color of the specified pixel.

6. The information input device according to one of claim 1, wherein the display unit identifies brightness of a color provided in the content and renders the user interface using a color obtained by changing the identified brightness by a predetermined amount, so that the user can easily distinguish between the user interface and the content that represents a background.

7. The information input device according to one of claim 1, further comprising a command unit configured to allow the user to select information input via the user interface instead of directly entering information in the input field in the content.

8. The information input device of claim 1, wherein the display unit displays the user input information in the gesture input area such that: (i) a first gesture is rendered in the gesture input area at a first translucence; and (ii) thereafter a second gesture is rendered in the gesture input area at the first translucence, whereby the first gesture is re-rendered at a second translucence, fainter than the first translucence.

9. An information input method comprising:

displaying a user interface for acknowledging user input information in a content including an input field displayed on a screen, by accepting an operation on the screen, the user interface being displayed by way of at least a gesture input area and a verification field, separate from the gesture input area, each defined by translucent border lines that appear superimposed in front of the content, and where the gesture input area includes a transparent region that overlies the input field;

analyzing the user input information received within the transparent region of the gesture input area and to recognize that the user input information represents one or more characters of one or more languages, where the gesture input area is a significantly larger area than an area of the input field;

providing, in the input field in the content, the one or more characters from the user input information acknowledged in the user interface;

displaying: (i) the user input information in the transparent region of the gesture input area such that the user input information overlies the input field, and (ii) the one or more characters in the verification field of the user interface, in a size larger than in the input field, where the verification field allows the user to verify the one or more characters recognized from the user input information provided in the gesture input area;

permitting the user to edit the one or more characters in the verification field using text input keys in order to change and accept the one or more characters; and updating the one or more characters to the changed one or more characters in the input field in the content.

10. The information input method of claim 9, wherein the displaying step includes displaying the user input information in the gesture input area such that: (i) a first gesture is rendered in the gesture input area at a first translucence; and (ii) thereafter a second gesture is rendered in the gesture input area at the first translucence, whereby the first gesture is re-rendered at a second translucence, fainter than the first translucence.

11. A non-transitory computer-readable recording medium containing a program, the program comprising:

a module configured to display a user interface for acknowledging user input information in a content including an input field displayed on a screen, by accepting an operation on the screen, the user interface being displayed by way of at least a gesture input area and a verification field, separate from the gesture input area, each defined by translucent border lines that appear superimposed in front of the content, and where the gesture input area includes a transparent region that overlies the input field;

a module configured to analyze the user input information received within the transparent region of the gesture input area and to recognize that the user input information represents one or more characters of one or more languages, where the gesture input area is a significantly larger area than an area of the input field; and a module configured to provide, in the input field in the content, the one or more characters from the user input information acknowledged in the user interface, wherein:

the module configured to display: (i) displays the user input information in the transparent region of the gesture input area such that the user input information overlies the input field, and (ii) displays the one or more characters in the verification field of the user interface, in a size larger than in the input field, where the verification field allows the user to verify the one or more characters recognized from the user input information provided in the gesture input area, the module configured to display permits the user to edit the one or more characters in the verification field using text input keys in order to change and accept the one or more characters, and the module configured to provide updates the one or more characters to the changed one or more characters in the input field in the content.

12. The non-transitory computer-readable recording medium of claim 11, wherein the module configured to display displays the user input information in the gesture input area such that: (i) a first gesture is rendered in the gesture input area at a first translucence; and (ii) thereafter a second gesture is rendered in the gesture input area at the first translucence, whereby the first gesture is re-rendered at a second translucence, fainter than the first translucence.

\* \* \* \* \*